United States Patent Office 3,608,132
Patented Sept. 28, 1971

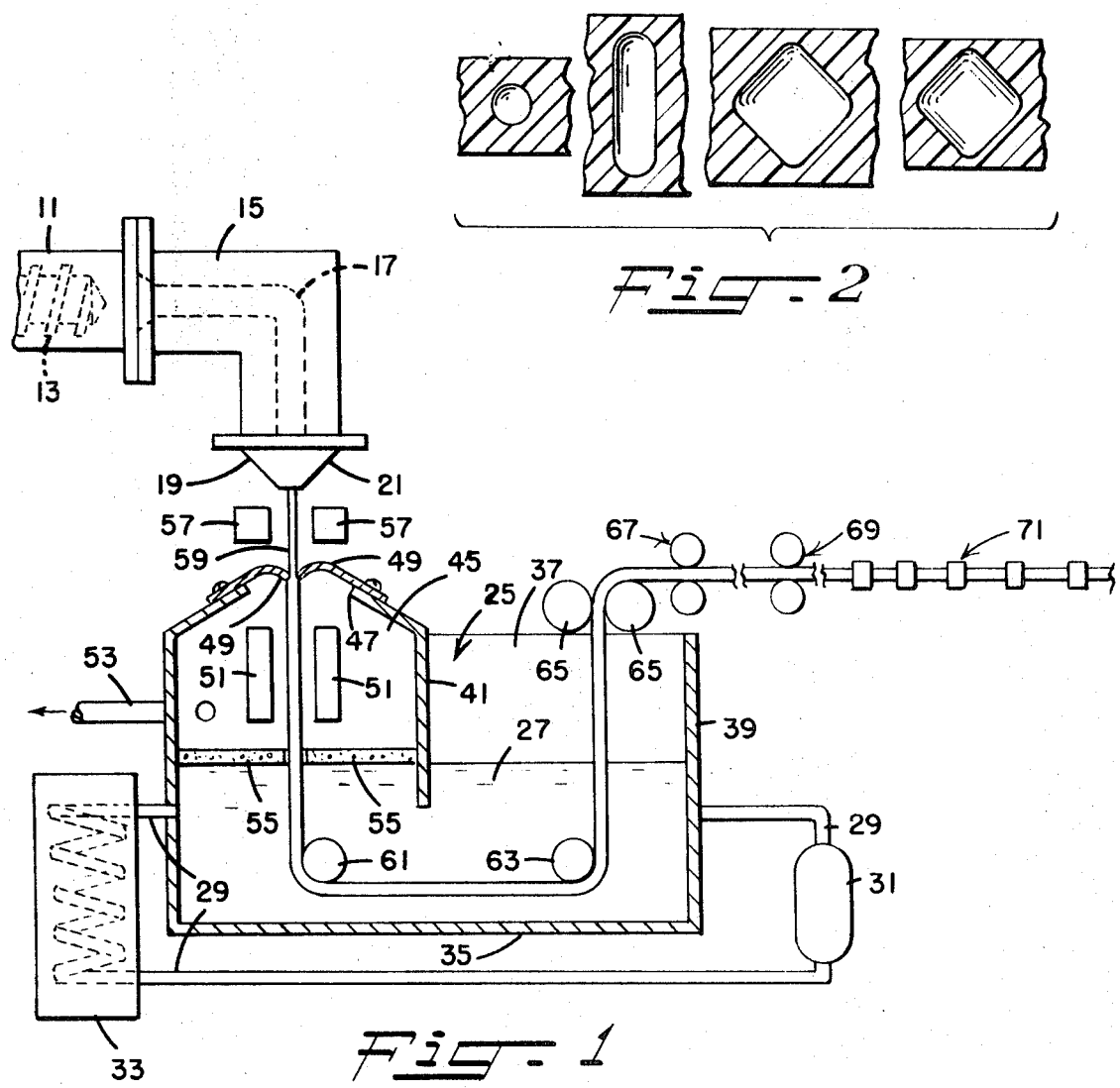
Fig-1
Fig-2
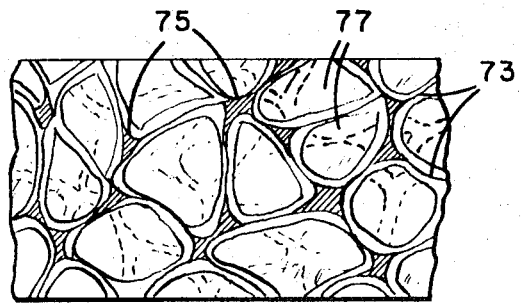
Fig-3

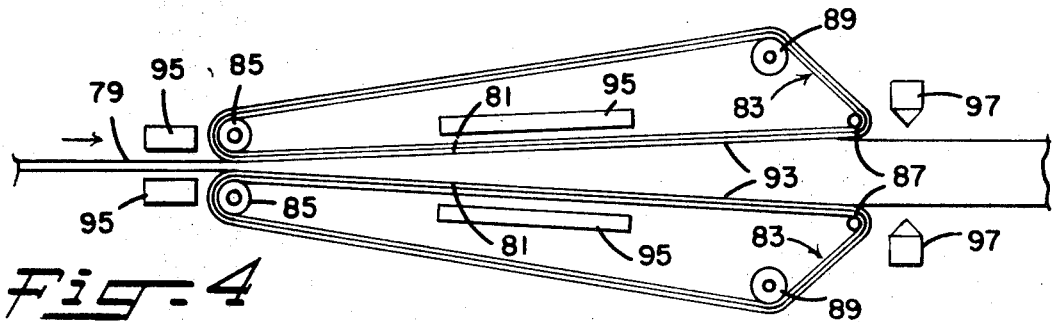
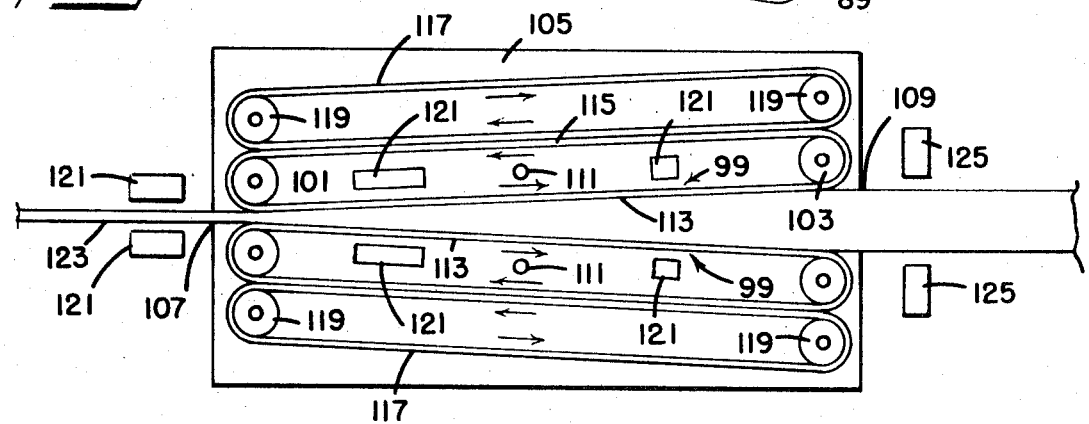
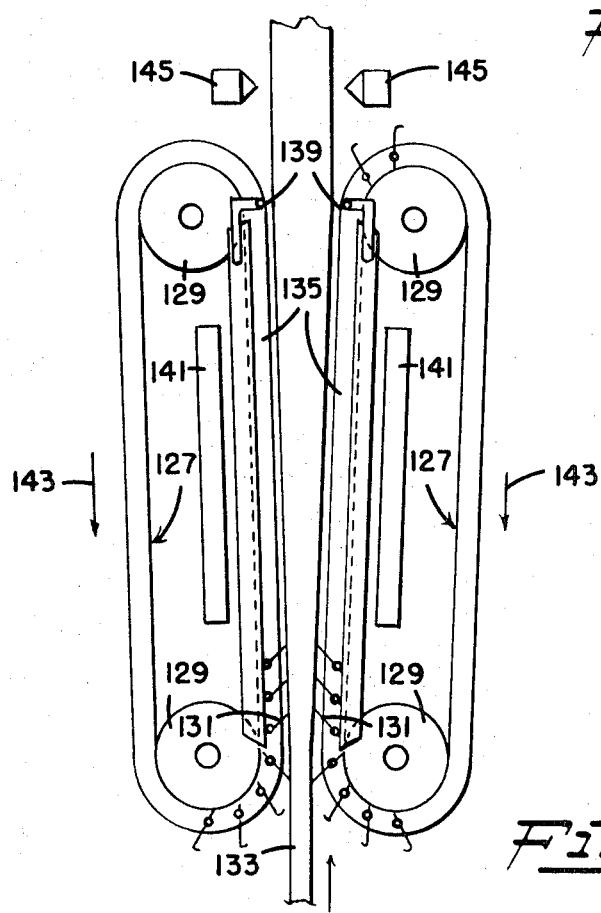

3,608,132
APPARATUS FOR MAKING ORIENTED, FOAMED ARTICLES
Dorsey C. Nelson, Springfield, and Theodore H. Fairbanks, Liverpool, Pa., assignors to FMC Corporation, Philadelphia, Pa.
Original application Oct. 10, 1967, Ser. No. 674,185, now Patent No. 3,530,761. Divided and this application Aug. 5, 1970, Ser. No. 61,061
Int. Cl. B29d 27/04
U.S. Cl. 18—1FB                               4 Claims

ABSTRACT OF THE DISCLOSURE

Apparatus for gripping the opposite sides of a foamed article of polymeric material and urge such sides away from each other to effect stretching and orientation of the molecules of the polymeric material in the direction of the article thickness.

---

This application is a division of our application Ser. No. 674,185, filed Oct. 10, 1967, Pat. No. 3,530,761.

The present invention relates to apparatus for making oriented, foamed articles formed of polymeric materials, and particularly articles which are in the form of nonwoven webs or fabrics.

In the manufacture of flat films or webs from polymeric materials, a conventional practice is to stretch the same along transverse and/or longitudinal directions to orient the polymer molecules thereof. As evidenced by U.S. Pat. 3,137,611 to Krolik, this same stretching practice has also been proposed for use with webs formed of foamed plastic materials in an attempt to improve certain properties thereof.

A foamed plastic web, however, is a three dimensional network and, when stretched in one or both planar directions, is distorted in the direction of its third dimension in an undesirable manner. More specifically, elements of this three dimensional network which originally are disposed generally perpendicuar to the plane of the foamed web, are subjected to compressive, rather than tensile, forces during the planar stretching of such web and thus may thicken in cross-section, buckle or become cemented together.

These distorted and unstretched elements of the foamed network often protrude from the opposite faces of the foamed web, giving it a harsh, rough feel and appearance. Further these elements, being unstretched, compressed or thickened, buckled and/or cemented to each other, are excessively rigid, as compared to the stretched elements of the foamed network, and thus the resulting web exhibits poor tear strength. More particularly, these unstretched elements cause the stresses which are at the apex of a tear to be concentrated on one or a few elements at a time, rather than permitting the stresses to be distributed widely over a number of elements. Accordingly, a primary object of this invention is to provide a generally new and improved and more satisfactory apparatus for making molecularly oriented article of foamed polymeric material.

Another object is the provision of an apparatus for making a non-woven fabric in the form of an oriented web of foamed polymeric material which possesses a desired soft fabric "hand" and has good teach strength properties.

Still another object is the provision of an apparatus in which an article of foamed, porous polymeric material is molecularly oriented in the direction of its cross-section or thickness.

A further object is thhe provision of an apparatus for making an article, and particularly a non-woven fabric which consists of a web of foamed, porous polymeric material, the molecules of which are oriented in the direction of the web-section or thickness and at least along one of the longitudinal and transverse directions thereof.

A still further object is to provide a simple and economical apparatus for use in the manufacture of continuous nonwoven fabrics from foamed, molecularly oriented polymeric materials.

Still further objects will appear from the following description.

These objects are accomplished in accordance with the present invention by an apparatus for subjecting a preformed generally closed cell foamed web or other shaped article of polymeric material to out-of-plane stretching which is sufficient to orient the molecules thereof, prior to conventional planar uniaxial or biaxial stretching thereof. The initial formation of the foamed web may be achieved in a conventional manner as, for example, by merely extruding under pressure, a shaped stream of molten, foamable polymeric material into the ambient air where it expands in its thickness direction as a mass of contacting bubbles and is quenched to below its second order phase transition temperature. The expansion which occurs during the web formation produces, at most, negligible orientation of the polymer molecules so that the formed web, if subjected to conventional planar stretching procedures at this stage, would possess a harsh and rough feel and poor tear strength properties, for reasons as heretofore mentioned.

With one form of apparatus of the present invention, a quenched, foamed web is passed through a reduced pressure atmosphere while the web itself is heated to an orientation temperature ranging between the first and second order phase transition temperatures of the polymeric material. In this manner, stretching or tension forces are exerted upon the opposite sides of the web, in the directions normal thereto, which expand the same and thereby induce orientation of the polymeric material in the direction of the web thickness. The web is then cooled to below its second order transition temperature to retain the molecular orientation which has been achieved. Desirably, the web is subsequently stretched along one, and preferably along both, of its longitudinal and transverse directions to provide for orientation of the polymer molecules along all three of the web dimensions.

The reduced pressure atmosphere to which the web is subjected is below atmospheric pressure and may be provided by evacuating a chamber having an entrance and exit through which the foamed web may pass with a minimum of air leakage. The degree to which such chamber is evacuated will determine the magnitude of the stretching forces which are exerted upon the foamed web and thus control the molecular orientation of the polymer molecules.

To secure good orientation of the molecules of polymeric material, the second atmosphere is preferably maintained at an orientation temperature ranging between the second order phase transition temperature of the particular polymeric material extruded and up to about 50° C. above such transition temperature. The polymeric material while within this orientation temperature range readily elongates under tension, with the polymer molecules assuming an aligned or oriented state under the stretching forces which are exerted during the expansion of the foamable material. Outside of this orientation temperature range, any permanent orientation of the polymeric material which is obtained is achieved only with great difficulty.

Final quenching of the oriented foamed web to below its second order phase transition temperature is effected rapidly, as by passing the same into and through a cool liquid bath.

Orientation of the foamed web along its longitudinal and/or transverse directions can be achieved using conventional equipment, as for example by passing the same from between a pair of slow moving nip rolls to a similar pair of nip rolls moving at a more rapid speed, and by the use of a tenter frame.

Stretching and orientation of the quenched, foamed web in the direction of its thickness may also be achieved by gripping the opposite sides of the web and urging the same away from each other in directions generally normal to such sides. More particularly, the web-contacting surface may consist of a pair of endless belts which are directed along diverging paths. The gripping forces between such belts and the web sides may be established by means of a conventional "pressure-sensitive" adhesive carried by the belts themselves. Such adhesives exhibit a strong resistance to tension forces which are exerted normal to the plane of contact but permit separation of the adhered members by a peeling action. Thus, as employed in the apparatus of the present invention, the adhesive coated endless belts would remain firmly bonded with the opposite sides of the foamed web throughout passage along their diverging paths, during which stretching and molecular orientation would occur in the direction of the web thickness. This bond between the web and endless belts would be released, however, by a peeling of the belts away from the web as the belts move beyond the ends of their diverging paths and reverse their paths of travel.

In lieu of an adhesive, as described above, gripping of the opposite sides of the foamed web by endless belts may be established by applying a suction or partial vacuum to the web through the opposing reaches of porous endless belts as they move along diverging paths. This can be achieved by causing the opposing reaches of the endless belts to travel over vacuum chambers or by having the endless belts themselves disposed within an evacuated chamber. In the latter instance, the belt reaches not in contact with the web would be covered, as by non-porous endless belts, to insure that the maximum suction or vacuum effect is exerted through the opposing reaches thereof.

As a still further alternative, endless belts equipped with tiny hooks may be employed. Such hooks would automatically engage with areas along the opposite surfaces of the foamed web, exert pulling or tension forces on the web in directions generally normal to the web thickness as the opposing belt reaches travel along diverging paths to thereby orient the molecules thereof, and would be released from the web as such opposing belt reaches reverse their paths of travel.

As with the first described apparatus for achieving orientation of the polymer molecules, stretching and orientation of the foamed web in the direction of its thickness is effected preferably while the web is heated to an orientation temperature. After orientation has been achieved, the foamed web is preferably stretched along one or both planar directions in a conventional manner.

The oriented web of foamed polymeric material or nonwoven fabric which is provided by the above-described apparatus consists of a mass of contacting cells which together provide a skeletal structure formed of a network of interconnected strands, with membranes joined to the sketal structure and partitioning contiguous cells. As a result of the stretching and orientation of the polymeric material along the three directions of the web, the skeletal structure is much stronger and thus more resistant to tearing than conventional foamed plastic products. Moreover, the stretching serves to thin both the cell skeletal structures and membranes thus giving the web a smooth fabric-like appearance and soft "hand."

Polymeric materials which are thermoplastic are preferred for use with the apparatus of the present invention and include the generally solid polymers, or mixtures of the polymers including such material as polymers of ethylene, propylene, styrene, vinyl chloride, etc. Foaming of such polymeric materials may be achieved by introducing a suitable gaseous medium therein during the extrusion or by incorporating solid materials which decompose into a gaseous state at the temperatures which are encountered during the extrusion operation.

The apparatus of the present invention are also applicable for use with non-thermoplastic materials, as for example cellulosic materials. In such instance softening of the material during stretching may be promoted chemically, as by stretching a foamed cellulosic web while it is in a xanthate condition, or by the use of plasticizers, including water, which remain in the material temporarily or permanently. With still other materials, stretching of the foamed material may be induced with no intentional softening thereof being required.

The atmosphere which is employed in the apparatus of the present invention is preferably air, although nitrogen or any other medium which will not react with the polymeric material which is being employed, may be used.

While reference is made throughout the description to a "foamed web," it will be understood that the teachings of the invention are not limited for use with webs alone, but are useful in the manufacture of other foamed products or articles which are of three dimensional character and in which their thickness dimensions are less, and preferably ten times less, than the other two dimensions thereof.

The degree of stretching of the foamed web provided by the apparatus of the present invention may be varied as desired and may range, for example from 1.1 to 1 (10%) up to about 8 to 1 (700%) or more, depending upon the ability of the particular material to stretching and the specific properties desired in the finished product.

In the drawing:

FIG. 1 is a side view of one embodiment of the apparatus of the present invention, with a portion of such apparatus being shown in section;

FIG. 2 is an expanded view diagrammatically illustrating a foam bubble or cell during various stages of the operation of the apparatus of the present invention;

FIG. 3 is a fragmentary view, on an enlarged scale, of a section of the non-woven fabric, formed by the apparatus of the present invention;

FIG. 4 is a side view of a modified apparatus of the present invention;

FIG. 5 is a view similar to FIG. 4 illustrating another form of apparatus; and

FIG. 6 is a view similar to FIGS. 4 and 5 showing a still further embodiment of the apparatus of the present invention.

With reference to the drawing, the apparatus of the present invention shown in FIG. 1 includes a conventional extruder having a barrel 11 within which a foamable polymeric material is rendered molten as it is advanced therethrough by a screw 13. An elbow 15, having a continuous feed passage 17, is attached at one end to the barrel 11 and at its opposite end supports a pair of nozzle blades or lips 19 and 21 which together serve to shape the molten, foamable polymeric material passing therethrough into a stream of desired thickness. As in known extrusion equipment, a breaker plate and, if necessary, screens are placed across the exit end of the barrel 11.

Located below and spaced away from the nozzle blade 19 and 21 is a tank 25 within which is contained a quenching liquid 27, as for example water. The quenching liquid 27 is preferably maintained at a temperature well below the second order phase transition temperature of the polymeric material which is being extruded by continuously circulating a portion thereof, by conduits 29 and pump 31, through a refrigerating unit 33.

The tank 25 includes a bottom wall 35, side walls 37 and end walls 39. A partition wall 41 extends between the side walls 37 with its lower edge being located above the bottom wall 35. A top wall 43 extends between an end wall 39 and the partition wall 41 so as to define a chamber 45. An opening 47 serves as an entrance into the chamber 45, and is normally sealed, as by resilient flaps 49, to minimize the entrance of air into the chamber itself. Suitable heating units 51 are located within the chamber 45. In addition, the chamber 45 is maintained in an evacauted condition by a suitable vacuum means, not shown, acting through a conduit 53.

The open bottom of the chamber 45 serves as an exit and is normally sealed from the ambient atmosphere by the liquid 27 contained within the tank 25. Foam matts 55 which float on the surface of the liquid 27 may be provided within the chamber 45 to shield such liquid from the effects of the heaters 51.

In the operation of the apparatus thus far described, molten, foamable polymeric material extruded from between the blades 19 and 21 as a shaped stream expands as it enters the ambient atmosphere and is cooled below the second order phase transition temperature of the polymeric material, as by air nozzles 57, to provide a stable foamed web 59. This web 59 is passed between the flaps 49 into the evacuated chamber 45 where its temperature is elevated to a range extending between the second order phase transition temperature and about 50° C. above such transition temperature by heaters 51. Under these temperature and pressure conditions, the expansion and stretching of the web occurs in the direction of its thickness, and thus cause orientation of the polymer molecules.

Upon passing from the chamber 45, the foamed and now oriented web 59 is immediately quenched to below its second order phase transition temperature by the liquid 27. Rollers 61 and 63 are provided within the tank 25 for directing the web 59 outwardly therefore as the web itself is advanced by draw rolls 65.

As diagrammatically illustrated in FIG. 1, pairs of nip rolls 67 and 69, moving at different speeds, are provided for longitudinally stretching the web 59 after it leaves the tank 25. Such stretching may be followed by stretching the web along its transverse direction, as by a conventional tenter frame indicated at 71.

With reference to FIG. 2, the fragmentary view shown at the left end thereof diagrammatically illustrates a single cell or bubble in the foamed web 59 prior to any orientation of the web polymeric material. The second of such views shows the expansion of the web cell in the direction of the web thickness as the web itself is heated to the orientation temperature range mentioned above and while it is under the reduced pressure atmosphere within the chamber 45. The remaining two views of FIG. 2 serve to illustrate the configuration assumed by a single web cell following longitudinal, and longitudinal and transverse stretching of the web.

The finished oriented foamed web 59, as illustrated in FIG. 3, includes strands 73 which are interconned at junctions 75 to provide a network structure, and thin membranes 77 which extend between the strands 73 and partition adjacent cells from each other. As a result of the three-dimensional orientation of the polymer molecules of these web portions, the web itself exhibits greater strength and tear resistance than known foamed webs. Further, the thinning of these web portions imparts a desirable soft or supple "hand" to the web, thus making it highly suitable as a non-woven fabric.

Stretching and orientation of a foamed web in the direction of its thickness may also be achieved in a manner as illustrated in FIG. 4 wherein opposite sides of a foamed web 79 are gripped by opposing and diverging reaches 81 of adhesive coated endless belts 83. Each of the belts 83 is laced over rollers 85, 87 and 89 and advanced, as indicated by arrows, 91, as by driving the roller 89. The adhesive coating on the belts 83 is indicated at 93 and is of the conventional pressure-sensitive type which exhibits strong resistance to separation by forces normal to the plane of contact, yet permits the foamed web to be easily separated from the belt reaches by a peeling action.

In the operation of the apparatus shown in FIG. 4, the foamed web 79 of thermoplastic polymeric material, preferably maintained at a temperature between its first and second order transition temperatures by heaters 95, enters inbetween the opposing reaches 81 of the endless belts 83 and is adhered thereto by the adhesive 93. As the belt reaches 81 travel between their respective rollers 85 and 87 they diverge relative to each other, causing the web which is adhered thereto to stretch in the direction of its thickness and thus orient the molecules thereof.

As the belts 83 travel about the rollers 87, at a rather sharp angle, they are peeled away from the web which continues its generally straight path and is quenched to below its second order phase transition temperature, as by air nozzles 97. Once stretched in its thickness direction, the web 79 may be stretched and oriented along planar directions in a conventional manner as heretofore described.

FIG. 5 illustrates a further embodiment of the invention which includes porous endless belts 99 each laced over a separate pair of rollers 101 and 103 so as to lie in diverging relationship. A chamber 105, having an inlet 107 and an outlet 109, encloses the belts 99 and is evacuated at 111. To insure that maximum suction is exerted through opposing reaches 113 of the belts 99; return reaches 115 thereof are engaged by non-porous endless belts 117 which are laced over rollers 119.

In the operation of the embodiment shown in FIG. 5, the chamber 105 is evacuated and the endless belts 99 and 117 are advanced in directions indicated by arrows, as by driving rollers 103. A foamed web 123 of thermoplastic polymeric material, maintained at a temperature between its first and second order phase transition temperatures by heaters 121, is advanced inbetween the opposing reaches of the belts 99. During travel with these belt reaches, the suction applied to the web 123 stretches the same in the direction of its thickness to thereby orient the molecules thereof. Upon leaving the chamber 105, the web 123 is cooled to below its second order phase transition temperature, as by air nozzles 125 and subsequently subjected to planar stretching in a conventional manner.

The embodiment illustrated in FIG. 6 includes a pair of endless belts 127 which are laced over rollers 129 in diverging relationship with each other. The belts 127 each are provided with tiny hooks 131 projecting from their entire surfaces at spaced locations thereof and designed to grip with surface portions of a web 133 of foamed, thermoplastic polymeric material as it enters inbetween opposing belt reaches 135.

As illustrated, the free ends of the hooks 131 are looped or curved in the direction of travel of the belt reaches 135 to insure proper gripping of the foamed web 133. Guide plates 137 are positioned along the paths of the belt reaches 135 and support rods 139 which serve to cam the hooks 131 away from the web 133 after web stretching is completed and the belts 127 commence a reversal of their paths of travel.

In operation of this last described apparatus, the foamed web 133, which is preferably maintained heated to within an orientation temperature range by heaters 141, is passed inbetween the endless belts 127 where it is gripped along its opposite sides by the multiplicity of hooks 131. The belts 127 are driven in the direction of arrows 143 by suitable means, not shown, advance the web 133 with which it is now firmly gripped and, in view of their diverging paths, cause the web to stretch in the direction of its thickness. As the belt reaches 135 commence to reverse their paths of travel, their hooks 131 are deflected away from the web 135 by the cam plates 139 so that tearing of the web is avoided. As with the previous embodiments, the web 133 may be quenched as by nozzles 145 as it leaves the belts 127 and then stretched in planar directions by conventional means.

It is to be understood that changes and variations may

We claim:

1. Apparatus for making an oriented foamed web including means engaging and gripping the opposite sides of a generally unoriented, closed cell foamed web of thermoplastic polymeric material, means for heating the gripped foamed web to within an orientation temperature range extending between the first and second order phase transition temperatures of the polymeric material from which the foamed web is formed, means for urging the gripping means away from each other in directions generally normal to the sides of the heated foamed web to thereby stretch the web in the direction of its thickness and orient the molecules thereof and means for cooling the stretched web to a temperature below its second order phase transition temperature.

2. Apparatus as defined in claim 1 wherein said gripping means includes a pair of endless belts having a coating of pressure-sensitive adhesive on the exposed surfaces thereof, and wherein said means for moving said gripping means away from each other includes means supporting opposing reaches of said endless belts in diverging relationship and means for advancing said belts at substantially the same rate of speed whereby successive portions of opposite sides of the foamed web are gripped by the coatings of pressure sensitive adhesive carried by said belts and are urged along diverging paths concomitantly with longitudinal advancement of the web.

3. Apparatus as defined in claim 1 wherein said gripping means includes a pair of endless belts having a multiplicity of hooks projecting from exposed surfaces thereof, and wherein said means for moving said gripping means away from each other includes means supporting opposing reaches of said endless belts in diverging relationship and means for advancing said belts at substantially the same rate of speed, the free ends of said hooks being looped in the direction of belt advancement, and cam means positioned adjacent to and extending across said belts adjacent to the divergent ends thereof for deflecting said hooks from the foamed web as it commences travel beyond said belts.

4. Apparatus as defined in claim 1 further including means for stretching the foamed web in at least one of its longitudinal and transverse directions after the stretching thereof in its direction of thickness.

References Cited
UNITED STATES PATENTS

| | | | |
|---|---|---|---|
| 2,618,012 | 11/1952 | Milne | 18—1X |
| 3,066,352 | 12/1962 | Ryberg | 18—4X |
| 3,431,164 | 3/1969 | Gilbert. | |

H. A. KILBY, JR., Primary Examiner

U.S. Cl. X.R.

18—5P, 12F

UNITED STATES PATENT OFFICE
CERTIFICATE OF CORRECTION

Patent No. 3,608,132      Dated September 28, 1971

Inventor(s) Dorsey C. Nelson

It is certified that error appears in the above-identified patent and that said Letters Patent are hereby corrected as shown below:

Col. 1, line 65, "teach" should read --tear;
line 70, "thhe" should read --the--. Col. 2,
line 2, "web-section" should read --web
cross-section --. Col. 3, line 54, after "tation"
and before "has" insert --temperature ranging
between the first and second order phase transition temperatures of the polymeric material. Once
such out-of-plane orientation--. Col. 5, line 53,
"interconned" should read --interconnected--.

Signed and sealed this 14th day of March 1972.

(SEAL)
Attest:

EDWARD M. FLETCHER, JR.
Attesting Officer

ROBERT GOTTSCHALK
Commissioner of Patents